(12) United States Patent
Simmons

(10) Patent No.: US 8,128,815 B1
(45) Date of Patent: Mar. 6, 2012

(54) PORTABLE SELF-CONTAINED VACUUM UNIT FOR USE WITH UNDER WATER VACUUM HEAD

(76) Inventor: Glen Simmons, Point Lookout, NY (US)

(*) Notice: Subject to any disclaimer, the term of this patent is extended or adjusted under 35 U.S.C. 154(b) by 219 days.

(21) Appl. No.: 12/364,907

(22) Filed: Feb. 3, 2009

Related U.S. Application Data

(60) Provisional application No. 61/071,163, filed on Apr. 16, 2008.

(51) Int. Cl.
*E04H 4/16* (2006.01)
*A01K 63/04* (2006.01)

(52) U.S. Cl. .............. 210/167.16; 210/167.23; 210/232; 15/1.7

(58) Field of Classification Search ............. 210/167.16, 210/167.17, 167.23, 232; 15/1.7; 4/490
See application file for complete search history.

(56) References Cited

U.S. PATENT DOCUMENTS

| | | | | |
|---|---|---|---|---|
| 3,132,364 | A * | 5/1964 | Oxley ............................... | 15/1.7 |
| 3,949,442 | A | 4/1976 | Chandler | |
| 4,429,429 | A | 2/1984 | Altschul | |
| 4,589,986 | A | 5/1986 | Greskovics et al. | |
| 4,615,802 | A | 10/1986 | Harbaugh | |
| 4,637,086 | A | 1/1987 | Goode | |
| 4,692,956 | A | 9/1987 | Kassis | |
| 4,959,146 | A | 9/1990 | Kristan | |
| 4,962,559 | A | 10/1990 | Schuman | |
| 5,197,158 | A | 3/1993 | Moini | |
| 5,317,776 | A | 6/1994 | DeMoura | |
| 5,454,129 | A * | 10/1995 | Kell ................................ | 15/1.7 |
| 7,520,015 | B1 * | 4/2009 | Ajello ............................. | 15/1.7 |
| 2004/0168838 | A1 * | 9/2004 | Erlich et al. .................... | 180/21 |
| 2005/0247613 | A1 * | 11/2005 | Bishop et al. ................. | 210/169 |
| 2005/0279683 | A1 * | 12/2005 | Erlich et al. ................. | 210/169 |
| 2006/0174430 | A1 * | 8/2006 | Pareti .............................. | 15/1.7 |
| 2007/0007192 | A1 * | 1/2007 | Reid .............................. | 210/269 |
| 2008/0313827 | A1 * | 12/2008 | Paxton ............................ | 15/1.7 |

* cited by examiner

*Primary Examiner* — Fred Prince

(57) ABSTRACT

A portable self-contained, battery operated vacuum unit which is attachable by a hose to an underwater vacuum head for cleaning the floor of a swimming pool, a pond, a fish tank, or the like includes a rotomolded body having lower wheels and an upper handle so that it can easily be wheeled to a desired location. The handle is formed as an overhang with lower bumpers so that the unit can be partially submersed in a pool hanging on the edge of the pool. The body contains a battery operated pump, a rechargeable battery selectively coupled to the pump by a switch, a filter and a basket. A hose coupling is arranged above the basket and the inlet of the pump is arrange below the filter which is located below the basket. The outlet of the pump is arranged at the bottom front of the unit. The unit may also be used as a filter for any liquid.

1 Claim, 3 Drawing Sheets

PORTABLE SELF-CONTAINED VACUUM UNIT FOR USE WITH UNDER WATER VACUUM HEAD

CROSS-REFERENCE TO RELATED APPLICATIONS

This application claims benefits from U.S. Provisional Patent Application No. 61/071,163, filed Apr. 16, 2008, the contents of which are hereby incorporated herein by reference.

BACKGROUND OF THE INVENTION

1. Field of the Invention

This invention relates broadly to pool and pond vacuum cleaners. More particularly, this invention relates to a portable self-contained, battery operated vacuum unit which is attachable by a hose to an underwater vacuum head for cleaning the floor of a swimming pool, a pond, a fish tank, or the like. The unit may also be used as a portable liquid filter to remove particulate matter from any liquid.

2. State of the Art

Modern swimming pools have very elaborate filter systems. Pool vacuum cleaners generally consists of a vacuum head coupled to a long pole and to a hose which must be connected to the pool filter. Once connected to the pool filter, it is often necessary to manually change the settings of several valves in order to put the filter in the correct mode to operate the vacuum cleaner.

Ponds often do not have filters. However, it may be desirable to clean the floor of an artificial pond. Similarly, it is desirable to clean the floor of a commercial fish (holding) tank.

SUMMARY OF THE INVENTION

The present invention provides a portable self-contained, battery operated vacuum unit which is attachable by a hose to an underwater vacuum head for cleaning the floor of a swimming pool, a pond, a fish tank, or the like. The unit may also be used as a portable liquid filter to remove particulate matter from any liquid.

The unit includes a rotomolded body having lower wheels and an upper handle so that it can easily be wheeled to a desired location. The handle is formed as an overhang with lower bumpers so that the unit can be partially submersed in a pool hanging on the edge of the pool. The body contains a battery operated pump, a rechargeable battery selectively coupled to the pump by a switch, a filter and a basket. A hose coupling is arranged above the basket and the inlet of the pump is arrange below the filter which is located below the basket. The outlet of the pump is arranged at the bottom front of the unit.

In operation, a hose is coupled to the hose coupling at one end and to a pool vacuum head at the other end. The pool vacuum head is submerged into the pool, and the vacuum unit is preferably partially submerged so that the pump outlet is under water. The pump is activated by turning on the switch. When the pump is activated, water (and debris) are drawn from the vacuum head through the hose into the hose coupling. The water passes through the basket and the filter, into the pump inlet and out of the pump outlet. The coarse debris is caught is the basket and the fine debris is caught in the filter.

The hose coupling is mounted on a removable plate so that access may be had to the basket and the filter for cleaning or replacement. The battery is preferably coupled to an electrical connector which is used to connect the battery to a charger.

Additional objects and advantages of the invention will become apparent to those skilled in the art upon reference to the detailed description taken in conjunction with the provided figures.

DETAILED DESCRIPTION

Figure 1:
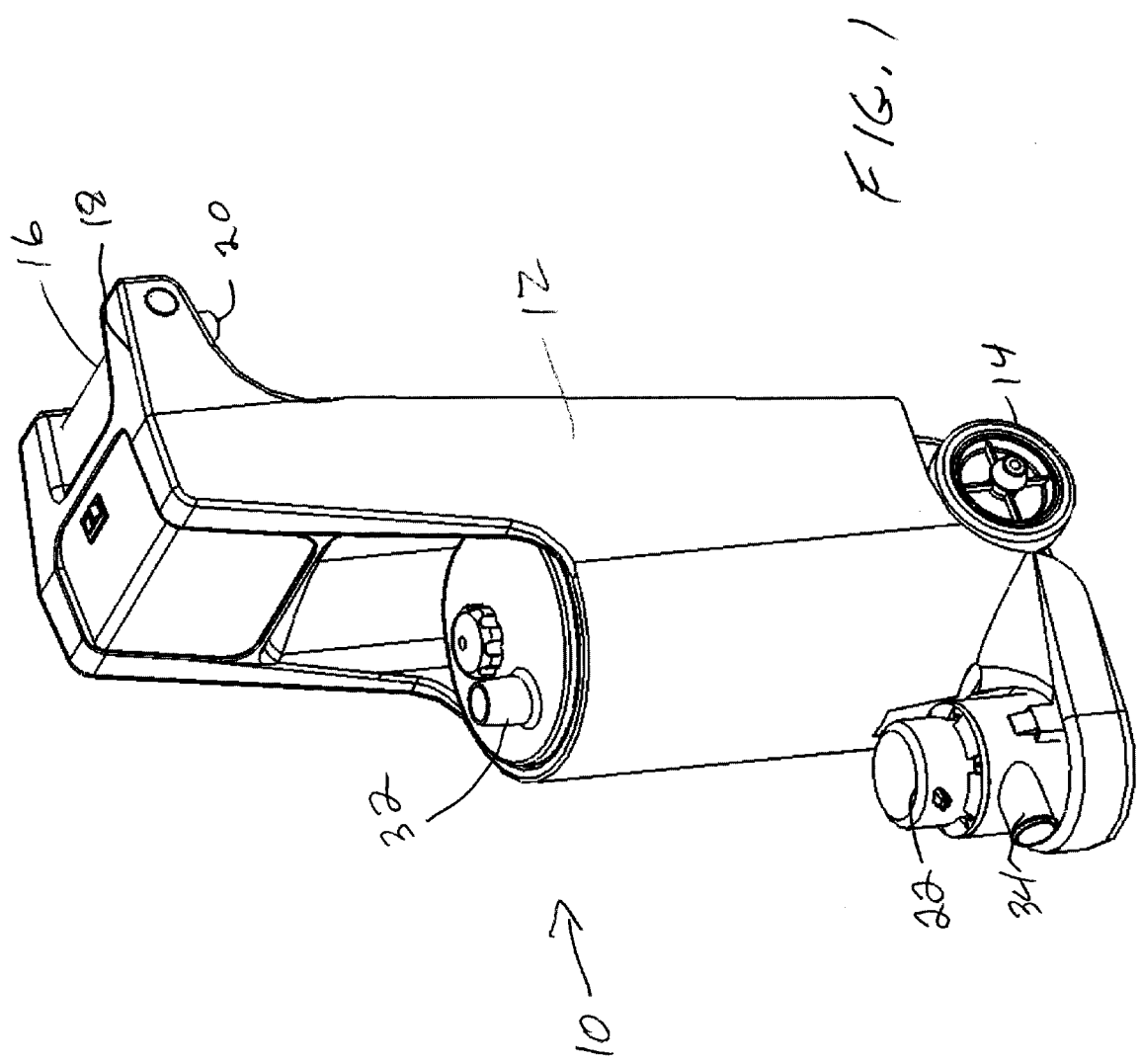
FIG. 1 is a front perspective view of an embodiment of the invention.
Figure 2:
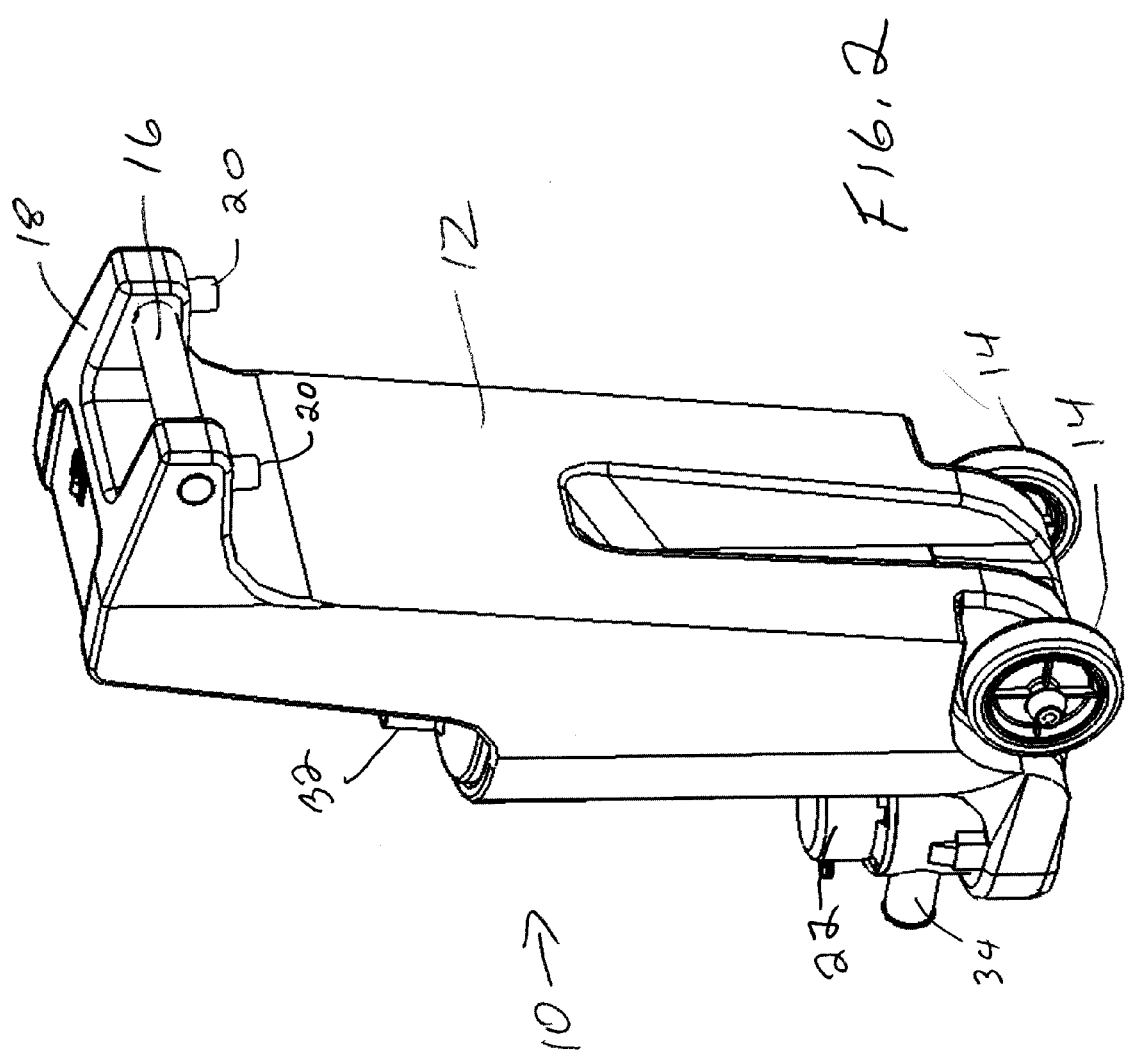
FIG. 2 is a rear perspective view of the embodiment of FIG. 1.

Turning now to FIGS. 1 and 2, The unit 10 includes a rotomolded body 12 having lower wheels 14 and an upper handle 16 so that it can easily be wheeled to a desired location. The handle is formed as an overhang 18 with lower bumpers 20 so that the unit can be partially submersed in a pool hanging on the edge of the pool.

Figure 3:
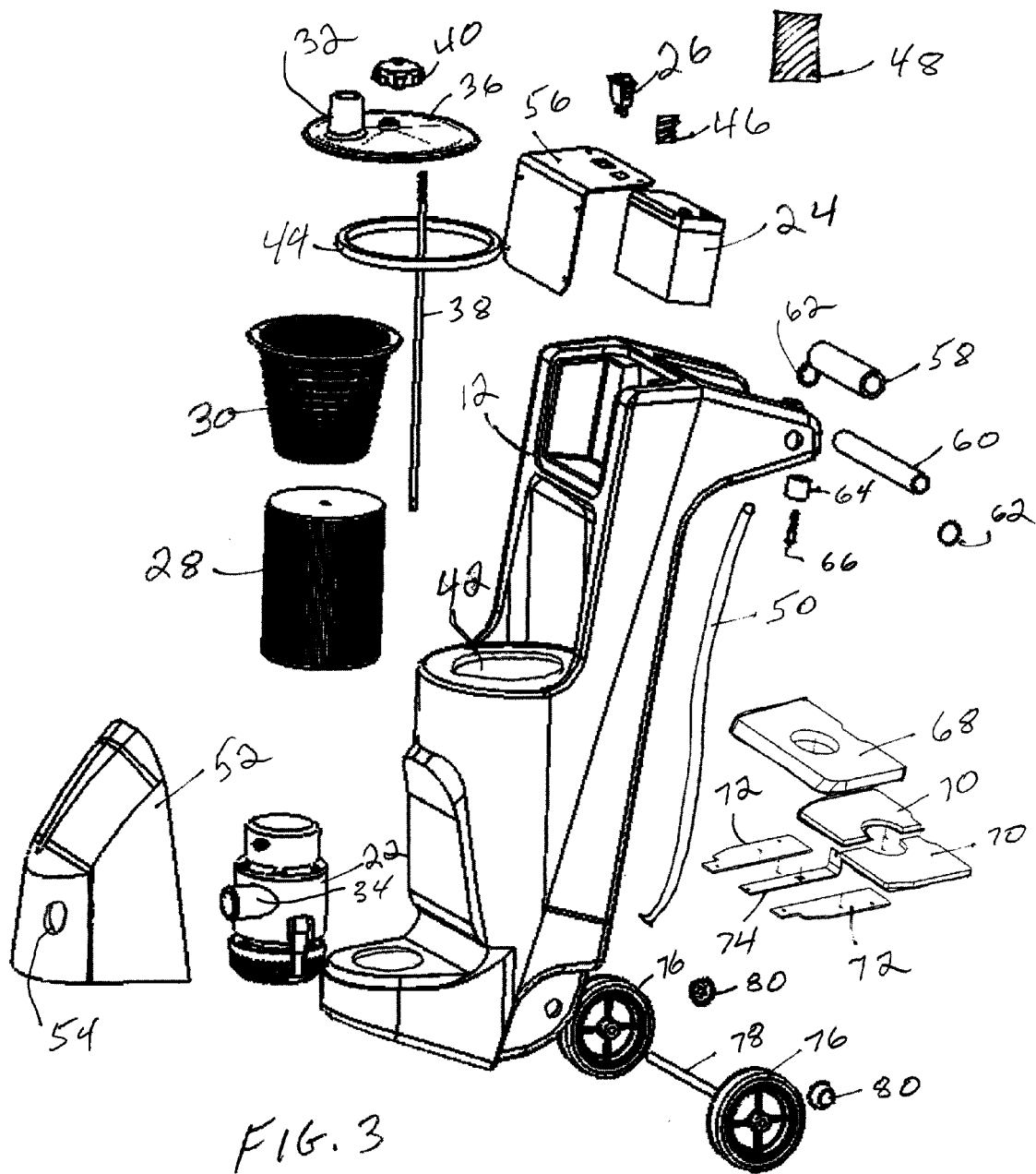
FIG. 3 is an exploded perspective view of an embodiment of the invention.

Referring now to FIGS. 1-3, the body 12 contains a battery operated pump 22, a rechargeable battery 24 selectively coupled to the pump by a switch 26, a filter 28 and a basket 30. A hose coupling 32 is arranged above the basket 30 and the inlet of the pump 22 is arrange below the filter 28 which is located below the basket 30. The outlet 34 of the pump 22 is arranged at the bottom front of the unit.

The hose coupling 32 is mounted on a removable plate 36 so that access may be had to the basket and the filter for cleaning or replacement. The plate 36 is coupled to the body 12 via a threaded rod 38 and threaded knob 40. The rod 38 passes through the filter 28, the basket 30, and the plate 36. One end of the rod 38 is fastened to the body 12 at the bottom of a cylindrical well 42 in which the filter 28 and basket 30 reside. The bottom of the well 42 is in fluid communication with the inlet of the pump 22. A gasket 44 is preferably placed between the plate 36 and the well 42. The battery 24 is preferably coupled to an electrical connector 46 which is used to connect the battery to a charger 48. A waterproof cable (or a cable inside a waterproof tube) 50 is used to connect the battery 24 to the pump 22. A pump shroud 52 preferably covers the pump 22 and has an opening 54 through which the pump outlet 34 communicates.

Additional hardware shown in FIG. 3 includes a switch plate/battery cover 56, handle components 58, 60, 62, bumper components 64, 66, bottom components 68, 70, 72, 74, and wheel components 76, 78, 80. The handle components include a rubber grip 58, an aluminum tube 60, and a pair of hole plugs 62. The bumper components include a pair of rubber bumpers 64 (only one shown) and a pair of bolts 66 (only one shown). The bottom components include a foam rubber gasket 68, a pair of base plates 70, side metal braces 72, and a middle metal brace 74. The wheel components include a pair of wheels 76, an axle 78, and a pair of end caps 80.

In operation, a hose is coupled to the hose coupling 32 at one end and to a pool vacuum head at the other end. A suitable vacuum head could be one such as those shown in the following U.S. Pat. Nos. (the complete disclosures of which are incorporated herein by reference): 3,949,442; 4,637,086; 4,692,956; 4,776,053; 4,835,810; 4,959,146; 5,033,149; 5,044,034; 5,398,361. Those skilled in the art will recognize other suitable vacuum heads. The pool vacuum head is submerged into the pool, and the vacuum unit is preferably partially submerged so that the pump outlet is under water. The pump is activated by turning on the switch. When the pump is activated, water and debris are drawn from the vacuum head through the hose into the hose coupling. The water passes through the basket and the filter, into the pump inlet and out of the pump outlet. The coarse debris is caught is the basket and the fine debris is caught in the filter. After a certain amount of vacuuming, the basket and filter are removed for cleaning.

There have been described and illustrated herein several embodiments of a portable self-contained, battery operated vacuum unit which is attachable by a hose to an underwater vacuum head for cleaning the floor of a swimming pool, a pond, a fish tank, or the like. The unit may also be used as a portable liquid filter to remove particulate matter from any liquid.

While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A portable, water-cleaning vacuum unit for swimming pools, spas, fish tanks or ponds, said unit comprising:
   a molded body equipped with lower wheels, a filter basket and pleated filter located below said filter basket;
   a battery cover located above a rechargeable battery;
   a pump covered by a shroud, said pump having an inlet and an outlet, said inlet being arranged below said filter, said outlet being located at a bottom of said unit, said battery being operatively connected to said pump by a switch and said battery being coupled to an electrical connector to connect the battery to a charger;
   a hose coupling arranged above said basket and configured for attaching one end of a hose, the other end of said hose being configured for connection to a vacuum head;
   a removable plate coupled to said body via a threaded rod and a threaded knob, said plate located above said filter basket, said rod passing through said filter, said basket and said plate; and
   a handle formed as an overhang with lower bumpers, said handle configured for hanging on an edge of a pool such that said unit is partially submersed in said pool, wherein said handle and said wheels facilitate movement of said unit to a desired location.

* * * * *